Sept. 10, 1968      J. E. COTTRILL      3,400,947
TWO-WHEEL SUSPENSION SYSTEM
Filed Aug. 3, 1966
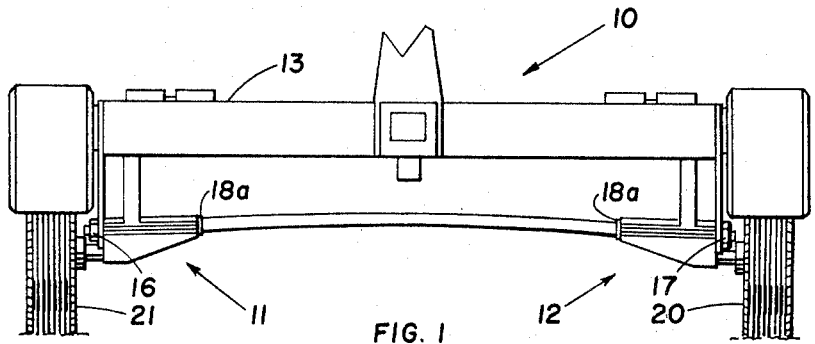
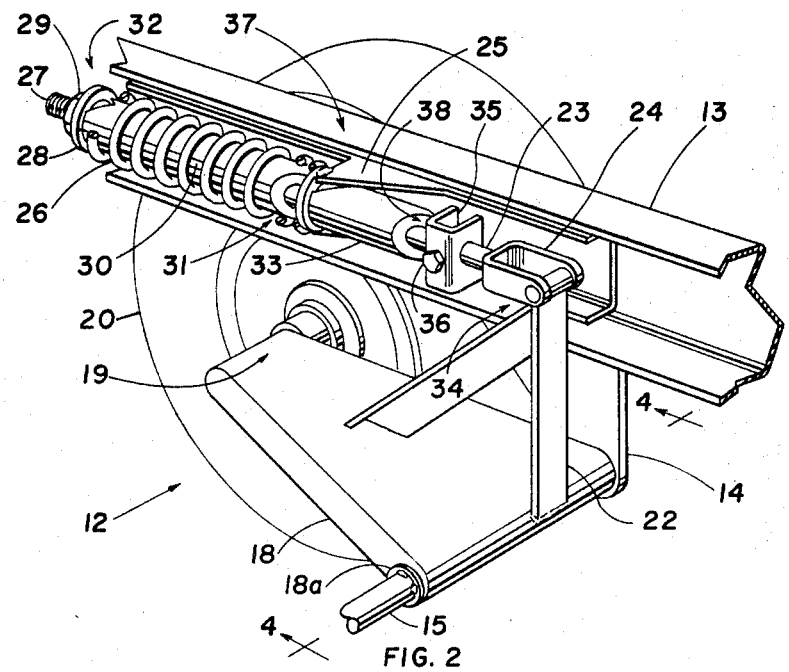
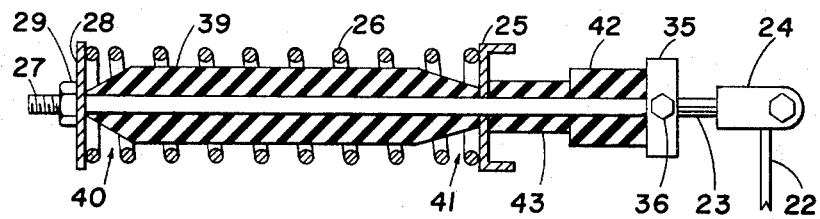
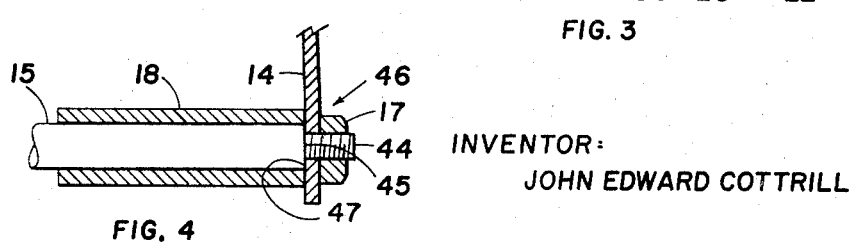
INVENTOR:
JOHN EDWARD COTTRILL United States Patent Office 3,400,947
Patented Sept. 10, 1968

3,400,947
TWO-WHEEL SUSPENSION SYSTEM
John Edward Cottrill, Grimsby, Ontario, Canada, assignor to George Hugh Stallard and Doreen Elizabeth Allen
Filed Aug. 3, 1966, Ser. No. 569,962
6 Claims. (Cl. 280—124)

ABSTRACT OF THE DISCLOSURE

This specification discloses a suspension system, such as a suspension system used on trailers and the like although obviously it may be used in other types of equipment, which suspension unit incorporates both spring means for carrying the load, and rubber means acting as shock absorbers and damping out the movement of the spring means. In addition, an axle member is provided extending between the pivot points of the two suspension units, which axle means is slightly curved and is adjustable so as to permit the adjustment of the "tow in" of the wheels on the suspension units.

---

This invention relates to improvements in suspension systems for trailers of the type shown in Canadian Patent No. 676,948.

Small lightweight trailers are commonly employed for transporting light objects such as for instance small boats and the like, the trailers being usually towed by automobiles. In many instances quite rudimentary suspension systems are employed consisting simply of a two-wheeled axle supported on coil springs, with or without shock absorbers. Such suspension systems are found to be quite unsatisfactory for use over rough roads, a condition to which lightweight trailers particularly boat trailers are often subjected to.

It has been found by resort to the present invention that many of the difficulties associated with prior lightweight trailers can be overcome. It should be understood that small trailers are manufactured of a particular size and in some cases in a particular range of sizes to accommodate various classes of small boats. However, small watercraft vary widely in weight, even in boats of the same class and for this reason the small boat trailers are subjected to various loads depending upon the selection of trailer and boat.

The problem of loading and stability of the trailer when being towed behind a car at usual highway speeds can be overcome by resort to the present invention. Thus adjustments are provided in the suspension system and certain damping features are built in whereby the trailer can be adjusted to the particular boat which it is to carry and the usual driving habits of the automobile driver.

The invention accomplishes these objects and features by the provision of a suspension system comprising a pair of axle support brackets rigidly secured to the trailer frame; a curved axle pivotally supported by said axle brackets; means for locking the rotational position of said curved axle; a pair of trailing arms pivotally supported on the outer ends of said curved axle and including at least one wheel on each said trailing arm; a pair of radius rods rigidly secured to and extending from said trailing arms adjacent the position of pivotal support on said curved axle; a pair of pull rods, one extending in pivotal attachment from the free swinging end of each of said radius rods in a direction opposite to the direction component of the moment of said wheels moving upwardly and to be tangent to about the mid-arc position of said radius rods, at normal loading on the trailer; a pair of frame brackets extending from the trailer frame to terminate at positions intermediate of the ends of said pull rods; a pair of suspension members, normally under resilient compression, each held thus between one said frame brackets and the free end of the respective pull rod; a pair of snubber blocks one each secured to the respective pull rod intermediate of the respective frame bracket and radius rod; and a pair of damping blocks interposed between the compressible ends of respective suspension members, said suspension members and said damping blocks acting in opposition to the turning moment of said trailing arms through action of said wheels, said snubber blocks resisting opposite moment, and rotational adjustment of said curved axle simultaneously altering the toe-in and camber of both said wheels for adjustment purposes.

Objects and features of the invention will be apparent from the following detailed description and accompanying drawing in which like numerals refer to like parts throughout the various views.

In the drawings:

FIGURE 1 is a front elevation view of a suspension system according to the present invention;

FIGURE 2 is a cut away perspective view of one side of the suspension system as illustrated in FIGURE 1;

FIGURE 3 is a section through an alternative form of suspension system from that illustrated in FIGURE 2; and FIGURE 4 is a section along the line 4—4 of FIGURE 2.

Referring to FIGURE 1 a suspension system for trailers is illustrated and indicated generally as 10. The suspension assembly 10 comprises one side assembly indicated at 11 and a second side assembly indicated at 12. The assemblies 11 and 12 are similar in construction and function, one being the opposite hand to the other. Both assemblies are secured to the trailer frame 13.

One side assembly 12 is shown in FIGURE 2 and comprises the axle bracket 14 rigidly secured to the trailer frame 13 and extending downwardly therefrom. The curved axle 15 is adjustably secured in the bracket 14 by means of the adjustment nuts 16 and 17 shown in FIGURE 1. The curve of the axle 15 can be of arcuate configuration or a somewhat modified bow form. Essentially all that is required is a slightly arcuate shape whereby the plane of the arc can be varied relative to the perpendicular.

A trailing arm 18 is pivotally supported on the axle 15 and held in position by flange 18a and extends rearwardly to provide attachment means as at 19 for the wheel 20. Similarly the wheel 21 is secured to the opposite side of the trailer frame 13. As has been stated the details of construction and of the parts are similar for both sides of the suspension system the handed parts merely being opposite in each case.

A radius rod 22 is rigidly secured to the trailing arm 18 adjacent to the position of rotation on axle 15 and extends upwardly to a position adjacent to the frame 13. A pull rod 23 is pivotally secured by means of the yoke 24 to the free swinging end of the radius rod 22 and extends in a direction approximately tangential to about the midpoint of the arc of swing of the radius rod 22. In this embodiment this position is parallel to the frame member 13. It should also be noted that a pull on the rod 23 will cause an opposing moment about axle 15 to that generated by support of the wheel 20 by trailing arm 18.

A frame bracket 25 is rigidly secured to the frame 13 and extends outwardly therefrom in a position intermediate the ends of the pull rod 23. A suspension member 26, which in this case is a coil spring, is supported between bracket 25 and the end 27 of pull rod 23 and is positioned around the rod in compression to act as an opposing force to an upward movement of the wheel 20. An end plate 28 together with the nut 29 threaded on the end 27 provide adjustable means for compressing the suspension member 26, thus to vary the preload on the member 26.

A damping block in the form of the thick walled rubber tube 30 is supported on the pull rod 23 between the compressed ends of the spring member 26. The damping block 30 acts as damping means for oscillations within the spring member 26 and during extreme compression of the spring member is squeezed out between the coils of the spring in order to prevent bottoming of the coils. The ends as at 31 and 32 of the damping block 30 are cut back at an angle whereby the end effect, that is to say the initial effect upon the damping block being compressed, provides gradual damping action, thereby to increase the effectiveness of the damping block at low compression positions.

A snubber block 33 is supported on the pull rod 23 in a position intermediate of the bracket 25 and the pivotal attachment as at 34 on the radius rod 22. An adjustment clamp 35 is also positioned on the pull rod 23 and held in position by means of the clamping screw 36 between the snubber block 33 and the pivotal attachment at 34. The snubber block 33 which in this case is a thick walled piece of rubber tube has been cut away at the ends as at 37 and 38 in a manner similar to that for the damping block 30 and for a similar purpose.

With reference to FIGURE 3 a further embodiment is illustrated wherein the suspension member 39 secured on pull rod 23 is provided with tapered ends as at 40 and 41. It will be seen that the end 40 comes to a more acute taper than does the more blunt end 41 which illustrates the possibility of varying the damping action at the beginning of compression by varying the area of rubber in contact with the compressed ends. For a similar purpose the snubber block 42 can be provided with a second block as at 43 which again is a method of varying the compressive action or rate of the rubber element. Other means of shaping the ends can be resorted to to provide characteristic damping and compression reactions in order to suit individual requirements.

Referring to FIGURE 4 a section through the attachment of the trailing arm 1 is shown wherein it will be seen that the end as at 44 of the shaft 15 is of reduced diameter to provide a shoulder 45 which butts against the axle bracket 14 and is secured and locked in place by means of the nut 17. It will be seen that the end of the axle bracket 15 as indicated at 46 is strained out of position, this straining action aiding in locking the curved axle 15 in rotational position also to improve the locking action, locking means in the form of serrations 47 can be provided on shoulder 45.

In use the suspension system 10 can be mounted beneath a trailer frame and in the manner as described and shown in the drawings. The size and capacity of the suspension members 26 can be varied to suit expected loading conditions on the trailer and adjustments for loads and driving conditions can be accomplished by means of the threaded nut assemblies 29 and by means of the moveable clamp 35. Thus loads on the system during driving can be equalized.

In order to change the toe-in and camber of the wheels the curved axle 15 can be rotationally adjusted and afterwards locked in position by the locking nuts 16 and 17. Considering the plane of curvature of the curved axle to be in a perpendicular position, a rearward movement of the centre of curvature would result in a greater amount of toe-in for the pair of wheels and a greater amount of camber. Conversely a forward movement of the centre of rotation for the curvature shaft would result in lesser amounts of camber and toe-in.

It should be further understood that while specific embodiments of the invention have herein been described and illustrated, the invention also contemplates such variations as may fall within the scope of the appended claims.

The embodiments of the invention in which an exclusive property or privilege is claimed are defined as follows:

1. A two-wheel suspension system for use with trailers having a supporting frame for carrying loads thereon, said suspension system comprising a pair of axle support brackets rigidly secured to the trailer frame; a curved axle pivotally supported by said axle brackets; means for locking the rotational position of said curved axle; a pair of trailing arms pivotally supported on the outer ends of said curved axle and including at least one wheel thereon each said trailing arm; a pair of radius rods rigidly secured to and extending from said trailing arms adjacent the position of pivotal support on said curved axle; a pair of pull rods, one extending in pivotal attachment from the free swinging end of each of said radius rods in a direction opposite to the direction component of the moment of said wheels moving inwardly and to be tangent to about the mid-arc position of said radius rods, at normal loading on the trailer; a pair of frame brackets extending from the trailer frame to terminate at positions intermediate of the ends of said pull rods; a pair of suspension members, normally under resilient compression, each held thus between one said frame brackets and the free end of the respective pull rod; and a pair of snubber blocks one each secured to the respective pull rod intermediate of the respective frame bracket and radius rod; and a pair of damping blocks interposed between the compressible ends of respective suspension members, said suspension members, and said damping blocks acting in opposition to the turning moment of said trailing arms through action of said wheels, said snubber blocks resisting opposite moment, and rotational adjustment of said curved axle simultaneously altering the toe-in and camber of both said wheels for adjustment purposes.

2. A suspension system as claimed in claim 1 wherein said damping blocks and said snubber block are formed from a length of resilient tubular material having the ends thereof cut at an angle to the central axis to provide less resilient resistance at said ends.

3. A suspension system as claimed in claim 1 wherein said damping block is provided with tapered ends of reduced thickness relative to the main body portion of the damping block.

4. A suspension system as claimed in claim 1 including adjustable stop means interposed between said snubber block and the pivoted end of said pull rod to adjustably precompress said snubber block between said clamping means and said frame bracket.

5. A suspension system as claimed in claim 1 including a second snubber block of reduced diameter relative to the first said snubber block.

6. A suspension system as claimed in claim 1 including a second damping block of reduced diameter relative to the first said damping block.

References Cited

UNITED STATES PATENTS 3,002,742  10/1961  Troy _____ 280—414

FOREIGN PATENTS 676,948  12/1963  Canada.

BENJAMIN HERSH, *Primary Examiner.*

L. D. MORRIS, *Assistant Examiner.*